UNITED STATES PATENT OFFICE.

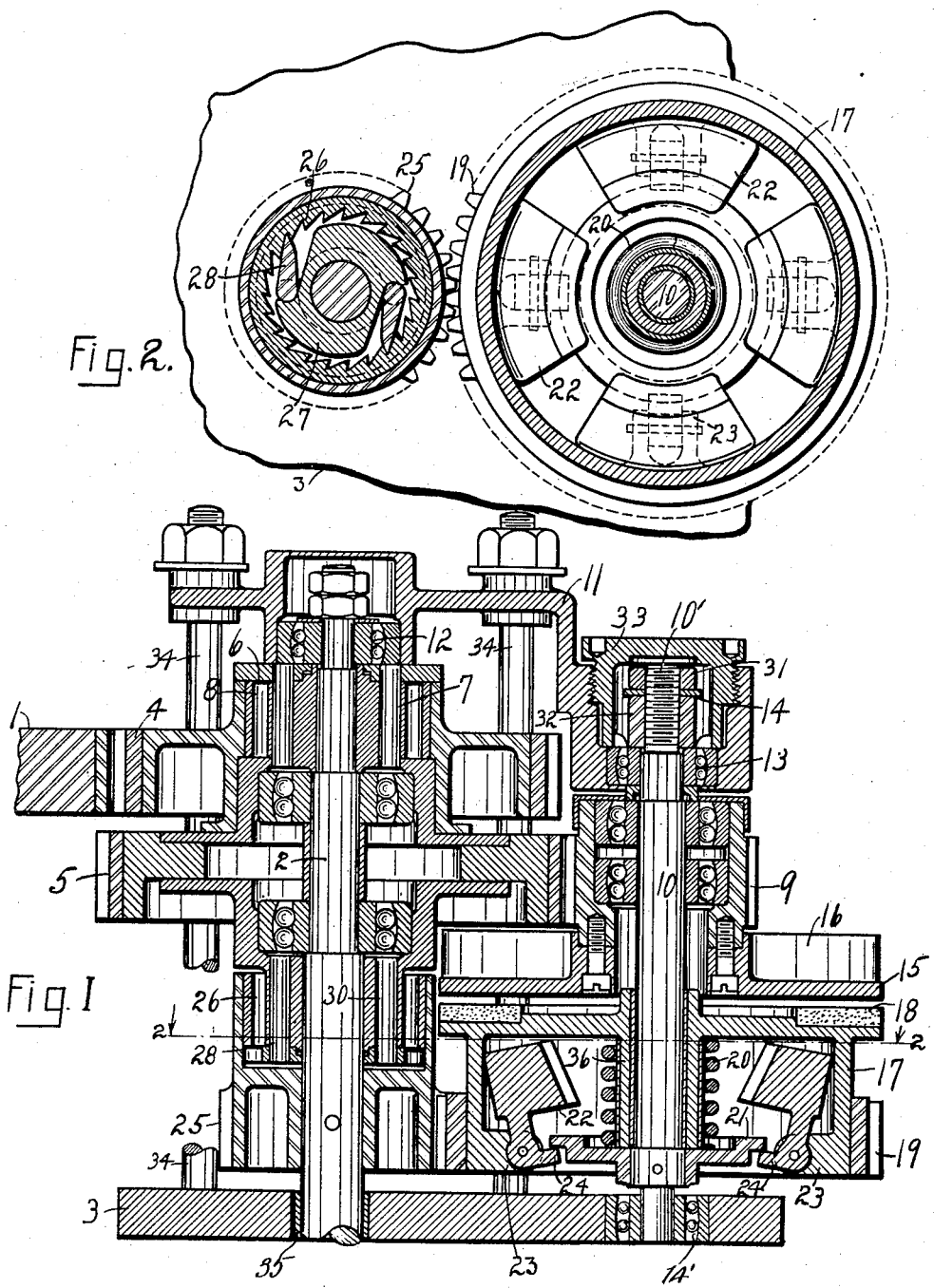

LAWRENCE B. SPERRY, OF BROOKLYN, NEW YORK, ASSIGNOR TO THE SPERRY GYROSCOPE COMPANY, OF BROOKLYN, NEW YORK, A CORPORATION OF NEW YORK.

TRANSMISSION-GEARING.

1,378,490.

Specification of Letters Patent.   Patented May 17, 1921.

Application filed February 25, 1915. Serial No. 10,458.

*To all whom it may concern:*

Be it known that I, LAWRENCE B. SPERRY, a citizen of the United States of America, residing at Brooklyn, N. Y., have invented certain new and useful Improvements in Transmission-Gearing, of which the following is a specification.

This invention relates to transmission gearing adapted to be used wherever it is desired to drive the load at a comparatively constant speed from a variable speed power source.

The object of my invention is to improve upon the construction of such gearing whereby a closer regulation is secured, and whereby power losses are reduced to a minimum. As the loss of power in transmission is especially great at high speeds, I provide means for reducing this loss to a minimum, when the mechanism is being operated at the high speed. A further object is to render such gearing suitable for use in driving small, auxiliary dynamos from multiple speed gas engines such as used on automobiles, aeroplanes and motor boats.

One embodiment of my invention is shown in the accompanying drawing, in which—

Figure 1 is a longitudinal section, and

Fig. 2 a transverse section on line 2—2, Fig. 1.

The drawings do not attempt to show either the primary driving or driven apparatus, but reference numeral 1 designates a rotatable portion of the driving means, such as an internal combustion engine. The main shaft 2 of the gear system serves to drive the driven means, such as a generator, in any approved manner, preferably directly as by making shaft 2 an integral part of the generator shaft. 3 represents the top or front bearing plate of the generator.

The transmission system may be geared to the driving means 1 by gear 4 journaled loosely on shaft 2. Adjacent gear 4 is a second gear 5, also journaled loosely on shaft 2. These two gears are connected preferably by means of a pawl and ratchet mechanism 6, the pawls 7 being mounted on a hub-like extension of gear 5, and ratchet teeth 8 being cut on the interior of the hub of gear 4.

Ratchet mechanism 6 is provided to prevent a backward rotation of the driving means from reaching the other portions of the transmission system. Gear 5 meshes with a pinion 9, journaled on a countershaft 10. A common frame 11 provides bearings 12 and 13 for the upper ends of shafts 2 and 10, respectively. Said frame is shown as secured to the generator end plate 3 by bolts 34. Bearings 35 and 14' are provided in said end plate for shafts 2 and 10 respectively.

Secured to gear 9 is a disk 15, which serves as one member of the friction clutch. Said disk may be provided with heat radiating ribs 16, if desired. The other member of the clutch comprises a member 17 slidably but non-rotatably secured on shaft 10. This member is provided with a friction face 18 and a gear 19 and is normally pressed into contact with disk 15 by a spring 20, which bears at its outer or lower end against a collar 21 pinned to shaft 10. Means are provided to vary automatically the pressure on the friction surfaces, which is responsive to the speed of the driven member 17. That is, when the speed of member 17 exceeds a predetermined value, its pressure on disk 15 is lessened so that a certain amount of slip takes place. Centrifugally operated, pivoted masses 22 may be employed for this purpose, being pivoted between pairs of ears 23 within member 17. Lugs 24 on the masses 22 normally bear against fixed collar 21. In the drawings the masses are shown as thrown out to the limit of their movement, thus withdrawing clutch face 18 from disk 15 against the action of spring 20 by means of the bell crank lever action of the lugs 24. This condition is only reached when the mechanism is being operated at high speed.

Either the contacts of masses 22 with the inner surface of member 17 or the contact of the spacing tube-like portion 36 of the hub of member 17 with collar 21, or both, may be used to provide the limit stop.

Preferably I provide means for varying the pressure between clutch faces 15 and 18 and for regulating the point at which the faces become disengaged. For this purpose I provide one end of shaft 10 with threads 10' and mount thereon a pair of nuts 31 and 32, spaced by a lock washer 14. Nut 32 bears against the inner race, which is loosely mounted on shaft 10, of ball bearing 13, so that shaft 10 will be axially adjusted by rotating the nut, thereby adjusting accurately the relative positions of disk 15 and collar 21. This adjustment, it will be seen, not only varies the pressure exerted by spring 20 on member 17, but also varies the point at which the clutch faces become disengaged. A detachable housing 33 may be provided for the threaded end 10' of shaft 10, so that nuts 31, 32 may be rendered accessible. The other end of shaft 10 is supported in bearing 14', as stated above.

The gear 19, referred to above, serves to drive a pinion 25, secured to shaft 2. Pinion 25 also has a pawl and ratchet connection 30 with gear 5, as by providing the interior of the hub of said gear with teeth 26 and by providing an extended hub portion 27 of gear 5 with pawls 28.

Since the entire mechanism is designed for use on aeroplanes, the parts are preferably made of some light metal such as aluminum or its alloys, where possible, only the gear teeth and other wearing surfaces being made of steel or the like.

The operation of my device is as follows:—

When the driving means is rotating slowly, shaft 2, is driven around through the speed multiplying gears 5, 9, 19, 25. Clutch 15, 18 is then engaged under maximum pressure so that little or no slip takes place. In case the driving means should gradually accelerate, the centrifugal action of masses 22 would gradually lessen the pressure between clutch faces so that more and more slip would take place. It will thus be seen that the difference in relative speed of the driving disk 15 and the driven member 17 gradually becomes greater, so that the speed of the driving gear 5 gradually approaches that of pinion 25. As soon as these last speeds become equal, that is, as soon as the velocity of the driving member 1 reaches a predetermined relation to the speed of the main drive shaft 2, a direct drive is established through pawls and ratchet mechanism 30. The design is preferably such that the clutch 15, 18 is entirely disengaged at or near the point where the direct drive around the clutch is established. Nuts 31 and 32 provide a ready means of adjusting the parts so that the desired result is secured.

Having described my invention, what I claim and desire to secure by Letters Patent is:—

1. In a constant speed transmission system, a driving portion, a driven portion, a friction clutch connecting said portions, means responsive to the speed of the driven portion for varying the pressure on the engaging surfaces of said friction clutch, and automatic means for driving said driven portion directly from said driving portion when the ratio of speed of the driving portion to that of the driven portion reaches a predetermined value.

2. In combination, a driving member, a driven member, means controlled by the speed of said driven member for maintaining said speed constant until said speed is substantially equal to the speed of said driving member and means for directly connecting said members when their speeds are substantially equal.

3. In combination, a driving member, a driven member, a clutch between said members and operative when the speed of one of said members exceeds the speed of the other member, a second clutch having a part connected to said driving member and a part connected to said driven member and means comprising a plurality of fly-weights pivotally connected to last named clutch part for governing the ratio of speeds of said two members.

4. The combination with a constant speed transmission device, of a friction cluch comprising a driving disk, a relatively movable driven member, a fixed abutment, a spring mounted within said member and held under compression between a portion of said member and said abutment, masses pivoted within said member, and having lugs thereon adapted to bear against said abutment upon rotation of the member, whereby the pressure exerted between the clutch faces is varied so as to maintain said member at a constant speed.

5. The combination with a constant speed transmission device, of a friction clutch comprising a driving disk, a relatively movable driven member, a fixed abutment, means for adjusting the position of said abutment, a spring mounted within said member and held under compression between a portion of said member and said abutment, masses pivoted within said member and having lugs thereon adapted to bear against said abutment upon rotation of the member whereby the pressure exerted between the clutch faces is varied so as to maintain said member at a constant speed and a gear fixed on said driven member.

6. In a transmission system, a driving member, a driven member, speed multiplying gears connecting said members, means for allowing slippage between said gears, means governed by the speed of said gears for varying the amount of said slippage and means for driving said driven member directly from said driving member when said slippage reaches a predetermined amount.

7. In a transmission system, a driving member, a driven member, mechanism connecting said members, means for varying the speed between the parts of said mechanism, and means for driving said driven member directly from said driving member when said variation reaches a predetermined value.

8. In combination, a driving member, a driven member, a clutch responsive to the ratio of the speeds of said members, a second clutch responsive to the speed of said driven member and means including said clutches operatively connecting said members.

In testimony whereof, I have signed my name to this specification in the presence of two subscribing witnesses, this 23rd day of February, 1915.

LAWRENCE B. SPERRY.

Witnesses:
EVERETT M. ROEDER,
ALBERT W. STRINGHAM.